A. P. HAWKINS.
TROLLEY GUARD.
APPLICATION FILED DEC. 15, 1914.
1,165,595.
Patented Dec. 28, 1915.
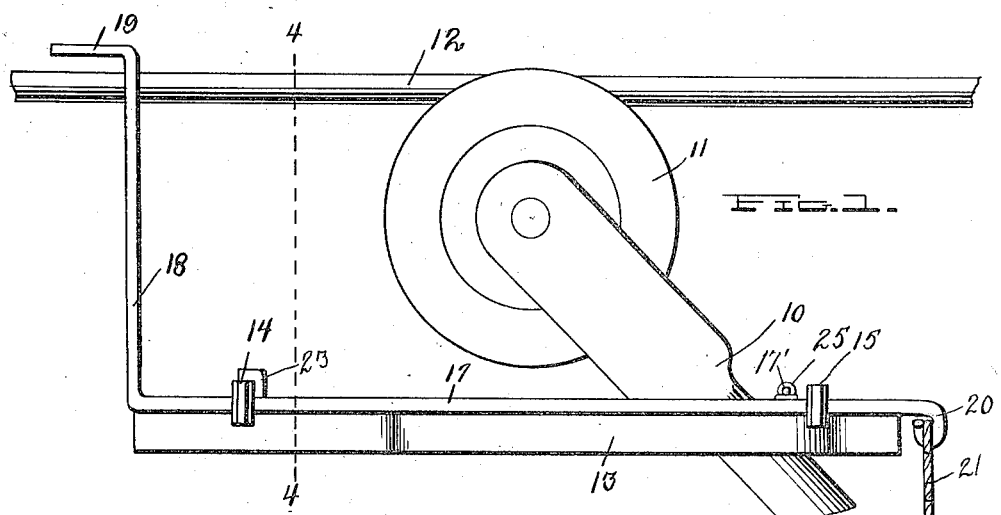
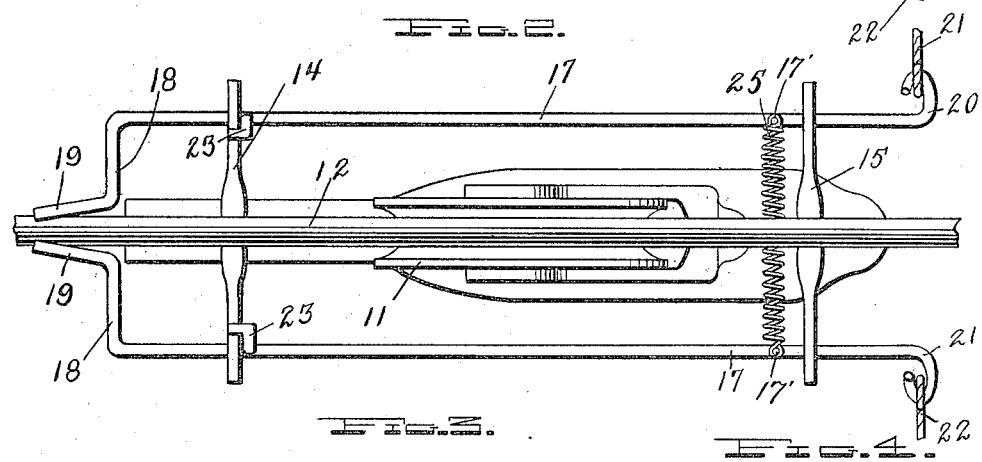
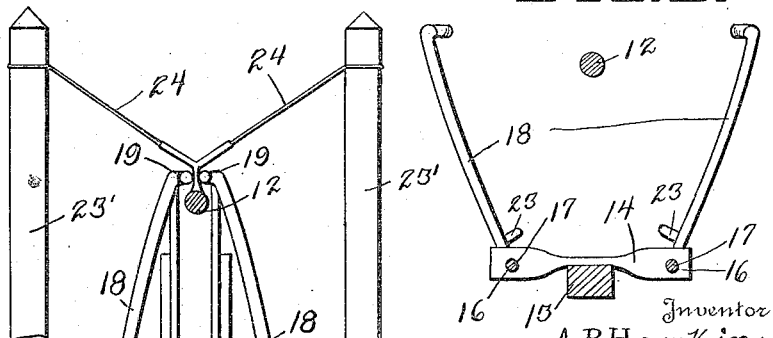
Witnesses
Arthur K. Moore
Harry M. Test
Inventor
A. P. Hawkins
By
Attorneys

UNITED STATES PATENT OFFICE.

ANDREW P. HAWKINS, OF NEWPORT NEWS, VIRGINIA.

TROLLEY-GUARD.

1,165,595.  Specification of Letters Patent. Patented Dec. 28, 1915.

Application filed December 15, 1914. Serial No. 877,315.

*To all whom it may concern:*

Be it known that I, ANDREW P. HAWKINS, a citizen of the United States, residing at Newport News, in the county of Warwick, State of Virginia, have invented certain new and useful Improvements in Trolley-Guards; and I do hereby declare the following to be a full, clear, and exact description of the invention, such as will enable others skilled in the art to which it appertains to make and use the same.

This invention relates to improvements in trolley attachments, and particularly to attachments for maintaining the trolley wheel on the wire.

Another object is to provide a simple and novel device of this character which is so constructed that it will readily pass the trolley wire hangers.

Another object is to provide a device of this character which can be readily manipulated to serve as a means for guiding the trolley wheel on to the wire when placing the trolley in contact therewith.

Other objects and advantages will be apparent from the following description when taken in connection with the accompanying drawings.

In the drawings: Figure 1 is a side elevation of a portion of a trolley pole and trolley wheel showing my invention applied thereto and in operative position as a guard, Fig. 2 is a top plan view, Fig. 3 is a rear elevation showing the device in position when acting as a guide, and Fig. 4 is a vertical section on the line 4—4 of Fig. 1.

Referring particularly to the accompanying drawings, 10 represents the trolley pole on the upper end of which is mounted a trolley wheel 11, said wheel being grooved and engaging with the trolley wire 12. Mounted on the pole below the wheel and extending rearwardly therefrom in parallel relation with the trolley wire is a base member or support 13 and mounted on the forward and rearward ends respectively of this base member are transverse bearing brackets 14 and 15, the ends of which are formed with openings 16 in which are rotatably mounted the longitudinal shafts 17. The rear ends of these shafts are turned upwardly into vertical position to form the arms 18 and then rearwardly at the upper ends of said arms to form fingers 19. These parts just described are disposed at the rear end of the base member rearwardly of the wheel 11. It will be noted that the arms 18 extend a short distance above the trolley wire 12, thus placing the fingers 19 in parallel relation to each other and to the trolley wire, and above the wire. The forward ends of the shafts 17 are bent to normally extend outwardly away from each other in the form of crank arms 20, and attached to these crank arms are the two short lengths of rope 21 which extend downwardly and inwardly where they are connected to the regular trolley rope 22.

In the ordinary supports of the trolley wires, guy wires lead from posts at the sides of the rod in an approximately straight line thereacross, the trolley hanger being secured to the inner ends of said guys. As the arms 18 of this device extend above the wire, such a structure as this would be engaged by said arms. To obviate this, the posts are either made taller or are brought to opposite sides of the track as indicated at 23' and then the guys 24 swung downwardly and inwardly from the posts, their lower ends supporting the wire. The angle at which the guys meet is such that the upper ends of the arms 18 will be permitted to readily pass.

The device as thus far described is a trolley guard to retain the trolley wheel on the wire, by reason of the upwardly projecting ends of the arms 18. Should it happen that the trolley should jump the wire and it is desired to replace the same, the rope 22 is pulled to lower the trolley as usual. This pulling of the rope rocks the shafts 17 and spreads the arms 18 apart in a downwardly and inwardly converging relation so that when the pole is allowed to move upwardly toward the wire the inclined positions of the arms 18 will readily guide the wire into the groove of the wheel 11.

On the rear portions of the shaft 17 are lugs 17' to which are connected the opposite ends of a coil spring 25, this spring normally rocking the shafts so as to move the arms 18 toward each other into the position shown in Fig. 3.

On the rear end portion of each of the arcuate shafts 17 is an upwardly and rearwardly directed lug 23, the same being inclined slightly inward toward the base 13. The rearwardly extending portion of the lug is disposed over the cross member 15, and snugly bears thereon to hold the portions 19 of the arms 18 from moving into engagement with each other by reason of the inward pull on the spring 25. By reason of the position of these lugs it will readily be seen that when the rope 22 is pulled and the shafts rocked, the lugs will readily move upwardly away from the member 14 so that the arms 18 will move outwardly away from each other.

What is claimed is:

A combined trolley guard and guide comprising a base member secured to the trolley pole beneath the wheel and in parallel relation with the trolley wire, longitudinally parallel shafts mounted on the base member and disposed on opposite sides of the trolley pole, the rear ends of the shafts being turned upwardly and rearwardly and extending slightly above the trolley wire, the forward ends of the shafts being resiliently connected so as to dispose the upturned portions in upwardly converging relation, outwardly extending crank portions on the rear ends of the shafts, and cables connected to the crank portions whereby the shafts can be rotated to move the arms into upwardly diverging relation so as to act as a guide, and means to limit the inward movement of the said arms.

In testimony whereof I affix my signature, in the presence of two witnesses.

ANDREW P. HAWKINS.

Witnesses:
 THOS. W. TURNER,
 HERMAN I. COHEN.

Copies of this patent may be obtained for five cents each, by addressing the "Commissioner of Patents, Washington, D. C."